(12) United States Patent
Hassner et al.

(10) Patent No.: US 6,498,692 B1
(45) Date of Patent: Dec. 24, 2002

(54) SYSTEM AND METHOD FOR PROCESSING MR/GMR HEAD SIGNAL USING PHASE MEASUREMENT

(75) Inventors: Martin Aureliano Hassner, Palo Alto, CA (US); Francesco Rezzi, Santa Clara, CA (US); Barry Marshall Trager, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 09/653,746

(22) Filed: Sep. 1, 2000

(51) Int. Cl.$^7$ .............................. G11B 5/02; G11B 5/09

(52) U.S. Cl. ................................. 360/25; 360/46

(58) Field of Search ............................. 360/25, 67, 46, 360/75

(56) References Cited

U.S. PATENT DOCUMENTS

| | | | | |
|---|---|---|---|---|
| 4,344,093 A | * | 8/1982 | Huber | 360/45 |
| 5,576,906 A | * | 11/1996 | Fisher et al. | 360/77.08 |

* cited by examiner

Primary Examiner—Regina N. Holder
(74) Attorney, Agent, or Firm—John L. Rogitz

(57) ABSTRACT

A circuit combines a read signal from an MR/GMR read head with a signal generated by a matched filter, the parameters of which depend on the geometry of the head and the output of which, generated every $N^{th}$ clock period, includes a real part and an imaginary part that models an expected head response. The combined signal is phase equalized and sent to a complex correlator, which integrates the signal over N clock periods to output a correlated signal having real and imaginary portions of the $N^{th}$ root of unity which correspond to bits in an N-clock data unit. The real and imaginary portions can subsequently be digitized and analyzed for errors.

27 Claims, 3 Drawing Sheets

SYSTEM AND METHOD FOR PROCESSING MR/GMR HEAD SIGNAL USING PHASE MEASUREMENT

BACKGROUND OF THE INVENTION

1. Field of the Invention

The present invention relates generally to processing signals from magnetoresistive (MR) and giant magnetoresistive (GMR) storage media heads using matched filters.

2. Description of the Related Art

In data recording devices such as magnetic disk drives and tape drives, MR and GMR heads are used to read data that has been recorded on the devices. These heads detect magnetic transitions on the storage medium that have been previously established ("written") on the medium to represent data. The output voltage of the head, including its phase, represents the transitions and, thus, the data on the medium.

As recognized herein, random and systematic errors can be introduced in the output signal of read heads in several ways. For example, errors can be introduced by incorrect read performance of the read head itself. To detect errors, data can be encoded with error correction symbols prior to writing and then decoded during the read process and checked to determine whether any errors occurred, but it is possible that a loss of synchronization between the encoding and decoding operations can itself result in errors. Errors can also be caused by so-called "thermal asperities", wherein the head accidentally contacts the recording medium (or a particle that rests on the medium).

In any case, significant encoding and decoding is undertaken along with accompanying error detection and correction as part of storing and retrieving data on, e.g., hard disk drives. The present invention understands that as the density of data on storage media increases and as the data transfer rates associated with improved storage devices also increase, the process of data storage and retrieval, including error detection and correction, grows ever more complicated. Moreover, when data is read every clock period and the clock periods grow ever shorter, the energy consumed by the read circuitry grows, an undesirable outcome particularly in the context of smaller, battery-powered computing devices.

In existing MR read devices the signal from the read head is shaped by an amplitude equalizer ("PR equalizer") and then sampled every clock period, with the sampled amplitudes of the shaped pulses then being digitized and their values used for detection. The present invention understands that this process, which requires sampling the output of the head each clock period, becomes performance-limiting and energy inefficient as the clock period shortens. Furthermore, the phase of the transitions sensed by the read head and represented by the output signal of the head cannot be measured directly using the PR equalizer structure, but must be indirectly determined by subsequent processing, which is undesirable as the data transfer rates of hard disk drives increase.

SUMMARY OF THE INVENTION

A read system includes a matched filter that is defined preferably by the geometric parameters of a read head device. The matched filter generates a matched output. A signal combiner combines the matched output with a read signal that represents magnetically stored data and that is generated by a read head of the read head device, and more particularly that represents the phase of an N-clock portion of a magnetic readback signal.

In a preferred embodiment, the matched output includes at least one symbol, and the matched filter generates successive symbols every N clock periods, wherein N is an integer such as three. Also, a complex correlator receives the combined signal and correlates the matched output with the read signal to render a correlated signal. In a preferred implementation, the signal combiner multiplies the matched output by the read signal to render the combined signal and the complex correlator integrates the combined signal. As disclosed in greater detail below, at the complex correlator output each symbol is represented as an imaginary number and a real number.

In a particularly preferred implementation, the matched filter includes a transform for generating the real number component of each symbol. Further, the matched filter includes delays, with each delay being characterized by a respective distance defined by the geometry of the head device. If desired, a phase equalizer can be provided for receiving the combined signal and equalizing phases between symbols, and then outputting a phase-equalized signal to the complex correlator.

In another aspect, a method for processing a signal from an MR or GMR head having a response includes generating a model of the response, and then generating a matched filter using the model. The method also includes processing an actual read signal from the head using the matched filter.

In still another aspect, a circuit is disclosed for processing a read signal from an MR or GMR read head device. The circuit includes a signal generator that generates a signal modelled on an expected signal of the read head device. A combiner receives the signal from the signal generator and combines it with the read signal to render a combined signal. Also, a phase equalizer processes the combined signal, and a correlator receives the output from the phase equalizer and generates a correlated signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
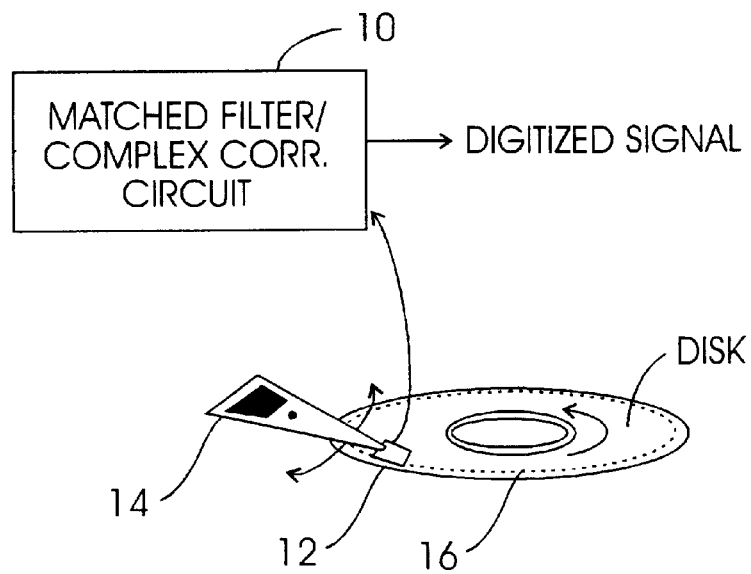
FIG. 1 is a schematic diagram showing a read head in juxtaposition with a disk of a hard disk drive.

Referring initially to FIG. 1, a matched filter/complex correlator circuit 10 is shown for processing a signal from a read head 12 of a read head device 14. In accordance with the present invention, preferred the head 12 is a magneto-resistive (MR) head or giant magneto-resistive (GMR) head. It is to be understood that the present principles can generally apply to heads that sense transitions in recording media and generate phase-dependent responses representative thereof.

The signal from the read head 12 represents data that has been stored on a data storage medium 16. In the embodiment shown, the medium 16 is a magnetic disk of a hard disk drive, although other recording media, such as magnetic tape, floppy diskette, and so on can be used. As indicated in FIG. 1, the output of the circuit 10 is a digitized output that can be processed to correct for, e.g., constraint errors.

Figure 2:
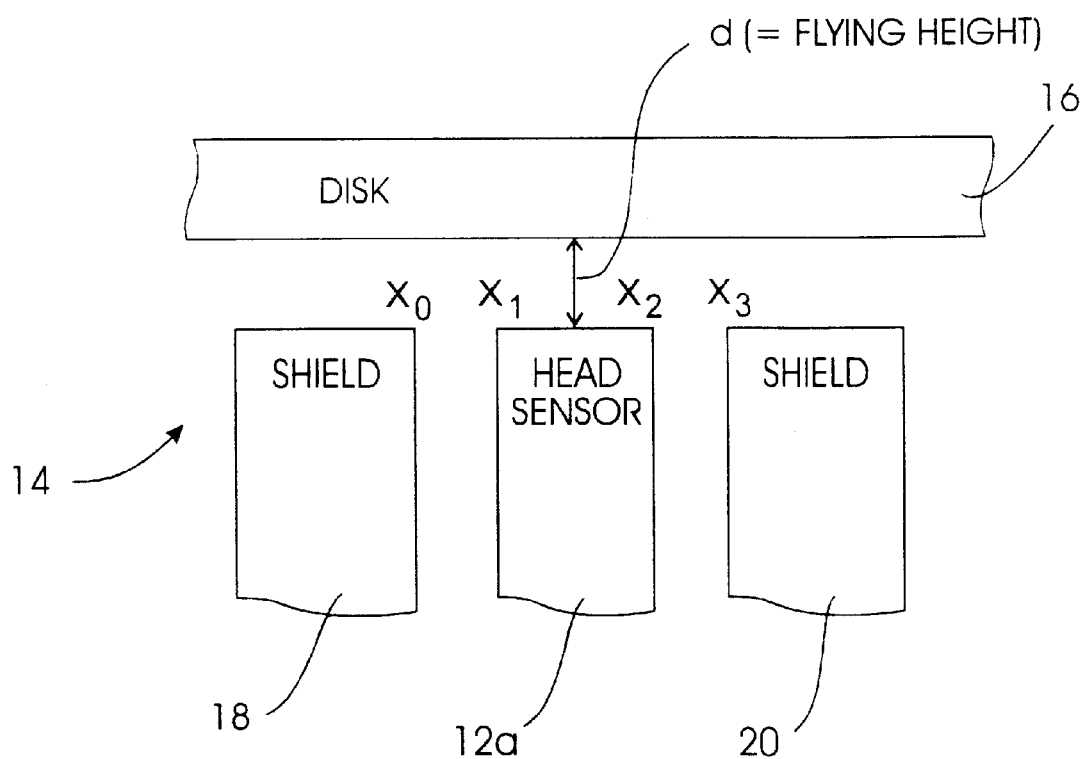
FIG. 2 is a schematic diagram showing a MR/GMR sensor between two shields, closely spaced from a disk.

FIG. 2 shows that the MR/GMR sensor 12a of the head 12 is spaced from the medium 16 by a distance "d", known in the art as the "flying height" of the head. Also, first and second shields 18, 20 are closely juxtaposed with the sensor 12a in accordance with principles known in the art. Certain linear dimensions of the head device 14 are shown in FIG. 2 and discussed further below. Specifically, the face of the first shield 18 that is closest to the head 12 can be considered to be at a coordinate $x_0$, and the surface of the head 12 facing the first shield 18 can be considered to be at a coordinate $x_1$. Also, the surface of the head 12 facing the second shield 20 can be considered to be at a coordinate $x_2$, whereas the face of the second shield 20 that is closest to the head 12 can be considered to be at a coordinate $x_3$.

Figure 3:
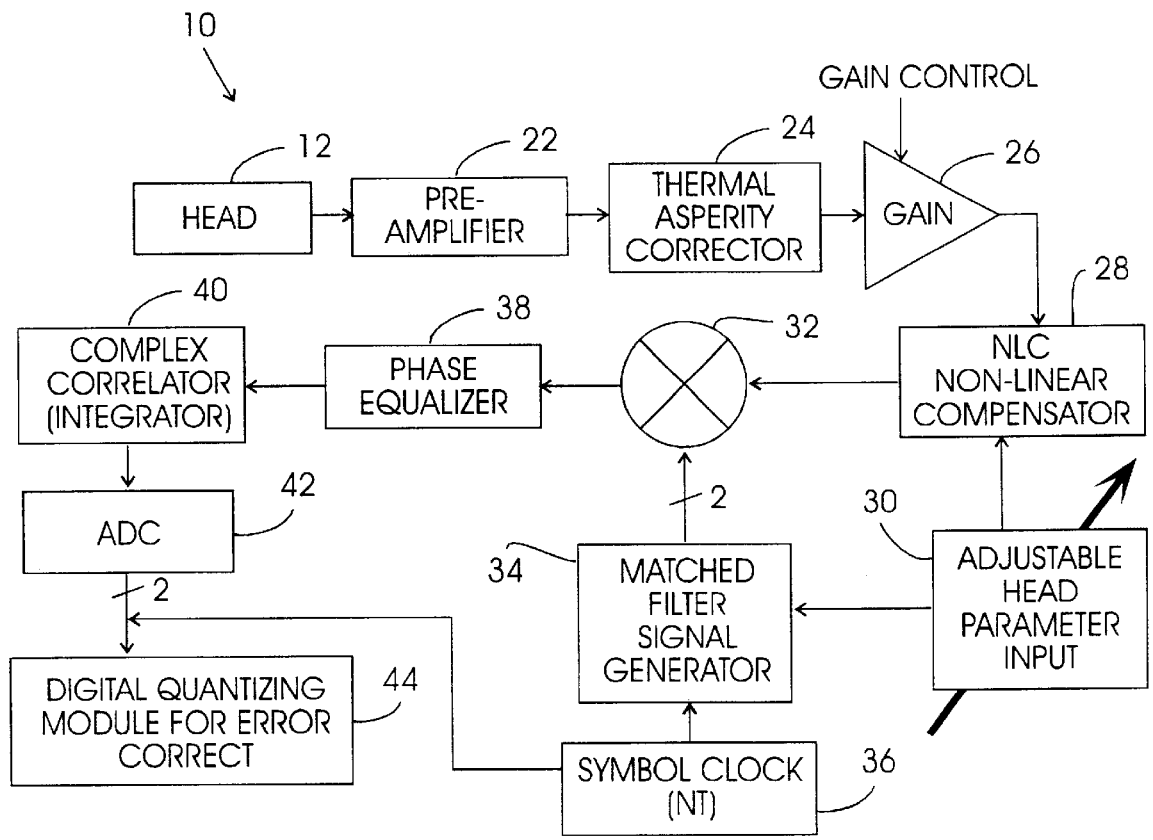
FIG. 3 is a functional block diagram of the present system.

Now referring to FIG. 3, the details of the circuit 10 shown in FIG. 1 can be seen. Per present principles, the circuit 10 can be included in the read channel chip that processes the read head device 14 output.

The read signal output of the head 12 is sent to a preamplifier 22, which amplifies the signal. The preamplified signal is then input to a thermal asperity correction module 24, which, in accordance with principles known in the art, removes spikes from the signal, referred to as "thermal asperities" and caused by the head 12 contacting another object. The signal is then sent to an adjustable gain amplifier 26, where it is amplified and sent to a non-linear compensator (NLC) 28. The NLC 28 removes non-linearities from the signal in accordance with principles known in the art using adjustable parameter input signals 30 representing head 12 parameters discussed further below.

As intended by the present invention, the read signal that is output by the NLC 28 is combined, at a combiner 32, with a matched signal from a matched filter signal generator 34, discussed more fully below. As shown, the matched filter generator 34 receives head-dependent parameter input signals 30.

Figure 4:
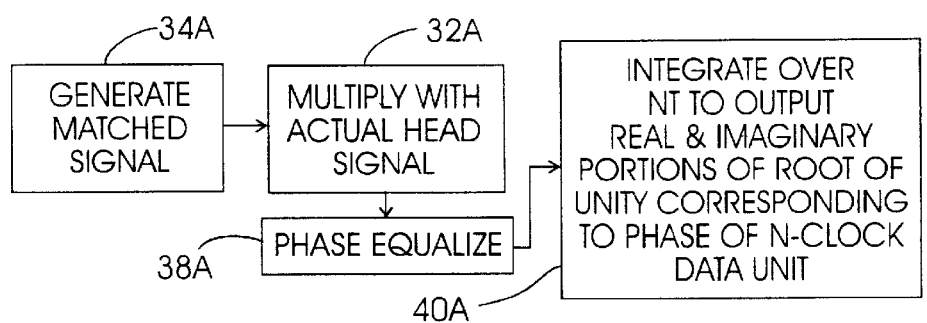
FIG. 4 is a flow chart showing the logic for processing the read head signal.

The generation of the matched signal is represented at block 34A in FIG. 4. Preferably, the read signal is multiplied by the matched signal by the combiner 32 to render a combined signal, represented at block 32A in FIG. 4. Essentially, as represented by the slash and the numeral "2" at its output in FIG. 3, the matched filter 34 is a finite impulse response (FIR) filter that generates a two-component signal every $N^{th}$ bit write clock cycle as determined by a symbol clock 36, specifically, a signal having a real component of a modelled head response signal and an imaginary component of the modelled signal. In one preferred embodiment, a matched signal is generated every third bit clock period.

The combined signal from the combiner 32 is sent to a phase equalizer 38. As intended by the present invention, the phase equalizer 38 diminishes the phase overlap, if any, between adjacent N-bit symbols in the combined signal, as represented at block 38A in FIG. 4. That is, the phase equalizer 38 ensures that the start of each N-bit symbol in the combined signal is at a predetermined phase, e.g., zero.

From the phase equalizer 38 the combined signal is sent to a complex correlator 40, which correlates the read signal with the matched signal from the matched filter 34. In one preferred embodiment, the complex correlator 40 integrates the product of the two signals over the N-bit period to output real and imaginary portions of a root (e.g., for N=3 the cubic root) of unity, with the resulting two numbers (real and imaginary) accordingly representing the phase of the bits in a single N-clock data unit. This is represented at block 40A in FIG. 4.

The output of the complex correlator 40 is digitized by an analog to digital converter 42. In turn, the output of the ADC 42 is sampled every $N^{th}$ clock cycle, as represented by the line between the output of the ADC 42 output and symbol clock 36, and sent to a digital quantizing module 44 for error correction, e.g., for detecting and correcting constraint violations from the read signal. As indicated by the slash and the numeral "2", the symbols input to the digital quantizing module 44 represent two numbers, namely, a real number and an imaginary number comprising the phase of an N-bit symbol.

Figure 5:
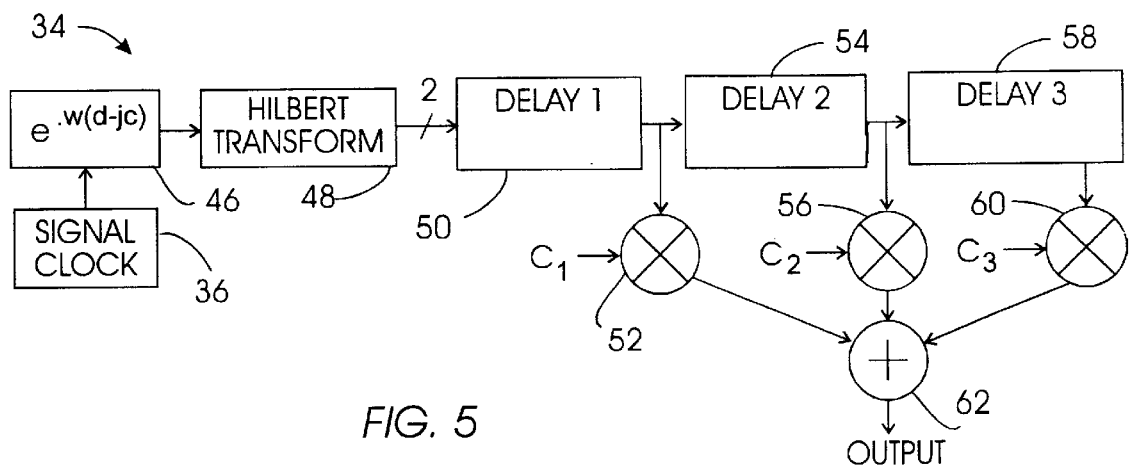
FIG. 5 is a functional block diagram of the matching filter.

FIG. 5 shows the details of one preferred implementation of the matched filter signal generator 34 shown in FIG. 3. Using the symbol clock 36, an imaginary number, represented at block 46, is generated every $N^{th}$ clock period by the matched filter signal generator 34. In one preferred embodiment, a signal is generated by filtering a square wave of period of NT with a filter whose frequency response is $e^{-\omega(d-jc)}$, where $\omega$ represents phase angle, d is the flying height of the head 12 shown in FIG. 2, j is the square root of negative one, and c is a constant that depends on the geometry of the head device 14. The constant c can be established by the distance between the shields 18, 20, i.e., $c=x_0$.

The signal that represents the imaginary part of an analytic waveform is sent to a Hilbert transform 48. In accordance with Hilbert transform principles known in the art, the Hilbert transform 48 generates a real number counterpart to the imaginary number. Then, the two signals are sent to preferably three delays, all of which are determined by the geometry of the head device 14.

More particularly, a first delay 50 is given by (x1–x0), where $x_1$ and $x_0$ are as shown in FIG. 2. The output of the first delay 50 is multiplied by a head geometry-dependent constant $c_1$ at a first multiplier 52, wherein $c_1$ is essentially a coefficient of the FIR filter that is established by the matched filter signal generator 34. Also, the output of the first delay 50 is sent to a second delay 54 given by (x2–x0), with the output of the second delay 54 being multiplied by a head geometry-dependent FIR coefficient $c_2$ at a second multiplier 56. Moreover, the output of the second delay 54 is sent to a third delay 58 given by (x3–x0), with the output of the third delay 58 being multiplied by a head geometry-dependent FIR coefficient $c_3$ at a third multiplier 60. The outputs of the three multipliers 52, 56, 60 are summed at a summer 62 and output as the above-discussed matched signal. The constants $\{c_1, c_2, c_3\}$ are part of the head response model, and depend on the geometry of the head, e.g., a distance between the sensor 12a and a shield.

Figure 6:
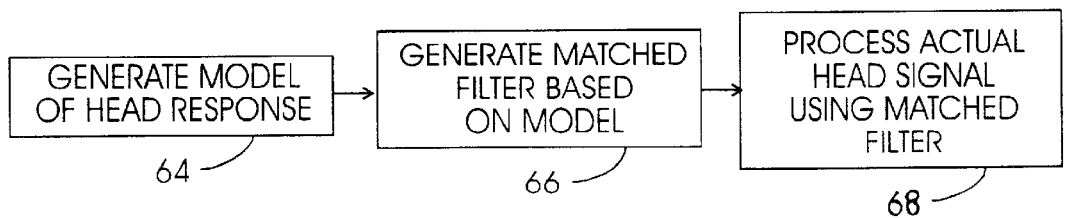
FIG. 6 is a flow chart showing the logic for defining the matching filter.

Now referring to FIG. 6, the details of deriving the matched filter signal generator 34 can be seen. Commencing at state 64, a model of the response of the head 12 to a magnetic transition on the disk 16 is generated. In one implementation, the imaginary portion of the modelled response can be given by $\Sigma_{k=1}^{3} c_k \log\{(x-x_k+jd)/(x-x_0+jd)\}$.

Once the head response has been modelled, the logic moves to state 66, wherein a matched filter signal generator such as the generator 34 is generated based on the model. Then, at state 68 an actual head 12 signal is processed as described above in reference to FIGS. 3 and 4, using the matched filter generated at state 66.

While the particular SYSTEM AND METHOD FOR PROCESSING MR/GMR HEAD SIGNAL USING PHASE MEASUREMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "tone or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A read system, comprising:
   a matched filter defined at least in part by at least one property of a read head device, the matched filter generating a matched output; and
   a signal combiner combining the matched output with a read signal representing magnetically stored data and generated by a read head of the read head device to output a combined signal that represents the phase of an N-clock portion of a magnetic readback signal,
   wherein N>1.

2. The system of claim 1, wherein the matched output includes at least one symbol, and the matched filter generates successive symbols every N clock periods, wherein N is an integer.

3. The system of claim 2, wherein N=3.

4. The system of claim 2, wherein the matched filter includes a transform for generating the real number of each symbol.

5. The system of claim 4, wherein the matched filter includes three delays.

6. The system of claim 5, wherein each delay is characterized by a respective distance defined by the head device.

7. The system of claim 1, further comprising a complex correlator receiving the combined signal and correlating the matched output with the read signal to render a correlated signal output.

8. The system of claim 7, wherein the signal combiner multiplies the matched output by the read signal to render the combined signal and the complex correlator integrates the combined signal.

9. The system of claim 7, wherein each symbol is represented by an imaginary number and a real number, such that the correlated signal output is an imaginary number and a real number representing the phase of an N-bit symbol.

10. The system of claim 7, further comprising a phase equalizer receiving the combined signal and outputting a signal to the complex correlator.

11. The system of claim 1, wherein the at least one property of the head device defining the matched filter is a flying height of the head.

12. The system of claim 1, wherein the at least one property of the head device defining the matched filter is a distance between the head and a shield.

13. A method for processing a signal from an MR or GMR head having a response, comprising the acts of:
    generating a model of the response;
    generating a matched filter using the model; and
    processing an actual read signal from the head using the matched filter, wherein the matched signal depends at least in part on at least one of: a flying height of the head, and a distance between the head and a shield.

14. The method of claim 13, wherein the processing act includes correlating the read signal with a matched signal generated by the matched filter.

15. The method of claim 14, further comprising the acts of:
    combining the matched signal with the read signal to render a combined signal; and
    phase-equalizing the combined signal.

16. The method of claim 14, wherein the correlating act includes integrating a combined signal to output a real portion and an imaginary portion of a root of unity corresponding to bits in a data wit.

17. The method of claim 16, wherein the act of integrating is undertaken over N clock periods and the data unit corresponds to bits in N clock periods.

18. A circuit for processing a read signal from an MR or GMR read head device including a read head, comprising:
    a signal generator generating a signal modelled on an expected signal of the read head device;
    a combiner receiving the signal from the signal generator and combining it with the read signal to render a combined signal;
    a phase equalizer processing the combined signal; and
    a correlator receiving an output from the phase equalizer and generating a correlated signal.

19. The circuit of claim 18, wherein the signal generator is a matched filter generating a matched output and the correlator is a complex correlator.

20. The circuit of claim 19, wherein the matched output includes at least one symbol, and the matched filter generates successive symbols every N clock periods, wherein N is an integer.

21. The circuit of claim 20, wherein N=3.

22. The circuit of claim 19, wherein the combiner multiplies the matched output by the read signal to render the combined signal and the complex correlator integrates the combined signal.

23. The circuit of claim 19, wherein each symbol is represented by an imaginary number and a real number, such that the correlated signal output is an imaginary number and a real number.

24. The circuit of claim 19, wherein the matched filter is characterized by at least one property of the head device selected from the group comprising: a flying height of the head, and a distance between the head and a shield.

25. The circuit of claim 19, wherein the matched filter includes a Hilbert transform for generating the real number of each symbol.

26. The circuit of claim 25, wherein the matched filter includes three delays.

27. The circuit of claim 26, wherein each delay is characterized by a respective distance defined by the head device.

* * * * *